United States Patent [19]

Fujioka et al.

[11] 3,944,705

[45] Mar. 16, 1976

[54] ELECTROSTATIC RECORDING MATERIAL AND MANUFACTURE THEREOF

[75] Inventors: Hironari Fujioka, Takatsuki; Takao Matsushita, Kobe; Taiji Higaki, Nishinomiya, all of Japan

[73] Assignee: Kanzaki Paper Manufacturing Company, Ltd., Tokyo, Japan

[22] Filed: May 20, 1974

[21] Appl. No.: 471,655

[30] Foreign Application Priority Data

| | | |
|---|---|---|
| July 26, 1973 | Japan | 48-84624 |
| July 26, 1973 | Japan | 48-84625 |
| Aug. 23, 1973 | Japan | 48-94726 |

[52] U.S. Cl. ................ 428/331; 428/405; 428/447; 427/121

[51] Int. Cl.[2] ........................ B32B 9/04; B32B 5/16

[58] Field of Search ............ 117/201, 100 A, 100 B, 117/100 S, 155 R, 161 ZA; 162/138; 427/58, 121, 219, 220, 221, 222; 428/403, 405, 331, 447

[56] References Cited

UNITED STATES PATENTS

| | | | |
|---|---|---|---|
| 3,504,625 | 4/1970 | Childress | 117/100 S |
| 3,516,854 | 6/1970 | Curry | 117/155 R |
| 3,526,533 | 9/1970 | Jacknow et al. | 117/100 B |
| 3,634,135 | 1/1972 | Akiyama | 117/201 |
| 3,672,928 | 6/1972 | Madrid et al. | 117/100 B |
| 3,833,366 | 9/1974 | Madrid et al. | 117/100 B |

*Primary Examiner*—Michael F. Esposito
*Attorney, Agent, or Firm*—Armstrong, Nikaido & Wegner

[57] ABSTRACT

In an electrostatic recording material comprising an electroconductive base sheet and a dielectric layer supported thereon, the electrostatic recording material being characterized in that the dielectric layer contains 10 to 70 wt.% of non-conductive and non-photoconductive finely divided powder coated with organopolysiloxane.

12 Claims, No Drawings

ELECTROSTATIC RECORDING MATERIAL AND MANUFACTURE THEREOF

This invention relates to an improved electrostatic recording material and a method for manufacturing the same, more particularly to improvements in an electrostatic recording material having an electroconductive base sheet and a dielectric layer supported thereon and to a method for manufacturing the improved recording material.

The electrostatic recording system has recently been widely applied to a facsimile or a computer input-output system or the like as a system suitable for high speed recording in a high speed telecommunication system, a high speed graphic reproduction system, etc. The electrostatic recording material as a recording medium basically comprises a nonphotoconductive dielectric layer, which serves as an electric charge-retentive layer, and an electroconductive base sheet which supports the dielectric layer. Electrostatic images of electrical signals formed on the electric charge-retentive layer are made visible with a developer comprising a toner and a carrier which has a polarity opposite to the polarity of the electrostatic image charge, and fixed as permanent visible images by further treatment.

Generally, the non-photoconductive dielectric layer of such electrostatic recording material is produced from a polymeric substance having insulating properties. When it is made of the insulating polymeric substance alone, the resin forms a substantially indiscrete film which renders the surface of the dielectric layer very glossy and therefore gives an unnatural appearance unlike ordinary office paper. Since the surface is very smooth and does not absorb aqueous or oily ink, it is not fully amenable to writing with a pencil, pen and ball point pen, to printing and to marking with a stamp. These are great disadvantages of the electrostatic recording material which is intended for a wide variety of uses.

To overcome the foregoing drawbacks, some proposals have heretofore been made, but the proposed improvements involve further drawbacks and are accordingly not satisfactory for practical use. For instance, it is known to render the dielectric layer rough-surfaced by incorporating in the insulating resin finely divided powder of a non-conductive inorganic or organic material such as barium sulfate, coloidal silica, titanium dioxide, zinc oxide, aluminum hydroxide, calcium carbonate, pulverized natural cellulose or starch in order to make the surface of recording material less glossy and to thereby improve the writing and marking properties. However, if the powder used is photoconductive as is the case with zinc oxide or titanium dioxide, the dielectric layer is prone to marked deterioration in its electrostatic characteristics, i.e. charge retentive and dielectric properties, even when exposed indirectly to visible rays or ultraviolet rays. It is noted, moreover, that the use of any powder reduces the insulating properties of the dielectric layer and increases its moisture-sensitivity or hygroscopicity, seriously impairing the electrostatic characteristics of the dielectric layer. Thus especially in a humid environment, the density of copy image lowers greatly to a level unfit for practical use. Such undesirable tendency is inevitable, although to a varying extent in accordance with the kind of the inorganic or organic powder. Especially in the case where the dielectric layer forming resin is a hydrophilic resin applicable as an aqueous coating composition, the resin permits the inorganic or organic powder to exhibit a greater tendency to retain absorbed water than is the case with a hydrophobic resin to be used in the form of coating composition of the organic solvent type, thereby deteriorating the electrostatic characteristics more markedly.

An object of this invention is to provide an improved novel electrostatic recording material free of the drawbacks described.

More specifically, an object of this invention is to provide an electrostatic recording material having the same appearance as substantially glossless ordinary paper for office use and capable of recording clear copy images.

Another object of this invention is to provide an electrostatic recording material highly amenable to writing with pencils and aqueous ink, stamping and printing.

Other objects and advantages of this invention will become apparent from the following detailed description.

The present invention provides an electrostatic recording material having an electroconductive base sheet and a dielectric layer supported thereon, which is characterized in that the dielectric layer contains 10 to 70 wt.%, based on the dry weight of the layer, of non-conductive and non-photoconductive finely divided powder coated with organopolysiloxane.

The non-conductive and non-photoconductive powder incorporated in the dielectric layer of electrostatic recording material of this invention gives its surface a glossless appearance like ordinary office paper and excellent writing, stamping and printing properties. Moreover, the organopolysiloxane coating the particles of powder remarkably represses the tendency that the use of powder reduces the insulating properties of dielectric layer and increases the hygroscopicity thereof, thereby permitting the dielectric layer to retain electrostatic characteristics substantially free of deterioration to record clear and sharp images. This effect is achieved only by coating the powder with organopolysiloxane. If the powder is coated with some other hydrophobic polymeric substance such as wax, polyethylene, polystyrene, polyacrylate or polyvinyl chloride, the resulting dielectric layer will exhibit very poor electrostatic characteristics.

Organopolysiloxanes to be used in this invention for coating the non-photoconductive powder include those having various organosiloxane units, representative examples of which are organopolysiloxanes having the following organosiloxane units and cross-linked products thereof:

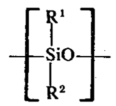

wherein $R^1$ is an organo group, and $R^2$ is an organo group, hydrogen atom, hydroxyl group or halogen atom. Preferable organo groups represented by $R^1$ and $R^2$ are each an alkyl group having 1 to 5 carbon atoms, acyl group having 2 to 4 carbon atoms, aminoalkyl group having 2 to 4 carbon atoms, iminoalkyl group having 2 to 4 carbon atoms, aralkyl group having 7 to 10 carbon atoms, phenyl group, alkoxyl group having 1 to 5 carbon atoms, acyloxyl group having 1 to 5 carbon atoms, alkenyl group having 2 to 8 carbon atoms or glycidyloxyl group.

According to this invention, the organopolysiloxane coating the fine powder is preferably one which itself has been cross-linked, because if the fine powder is coated with cross-linked organopolysiloxane, the dielectric layer will have more excellent electrostatic characteristics than when the polysiloxane is not cross-linked. In fact, outstanding electrostatic characteristics are assured by cross-linked organopolysiloxane even at high humidities or even when the insulating polymeric substance to form the dielectric layer is applied in the form of an aqueous coating composition. The cross-linked organopolysiloxanes in the present invention include those having two-dimensional linear structure and those having three-dimensional reticular structure obtained by the mutual reaction of organopolysiloxanes. In accordance with the mechanism of cross-linking reaction, such cross-linked organopolysiloxanes are classified into the condensation polymerization type and the addition polymerization type. The former includes a) the condensation products of polysiloxanes having organohydroxysiloxane units, b) the condensation products of polysiloxane having organohydroxysiloxane units and polysiloxane having organohydrogensiloxane units, and c) the condensation products of polysiloxane having organohydroxysiloxane units and polysiloxane having alkoxysiloxane units. The polysiloxanes having organohydroxysiloxane units are preferably those having the same organo group as one represented by $R^1$ referred to above, among which those having an alkyl group having 1 to 5 carbon atoms or phenyl group are more preferable. Generally used as the most preferable is polysiloxane having the terminal end closed with a hydroxyl group and represented by the formula

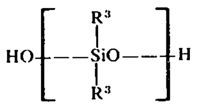

wherein $R^3$ is an alkyl group having 1 to 5 carbon atoms and phenyl group. Preferable as the polysiloxanes having organohydrogensiloxane units are also those having the same organo group as represented by $R^1$, among which more preferable are those having an alkyl group having 1 to 5 carbon atoms or phenyl group. The polysiloxanes having alkoxysiloxane units are preferably those in which the alkoxysiloxane unit has an alkoxyl group and the same organo group as represented by $R^1$ above.

The most preferable cross-linked organopolysiloxanes of the addition polymerization type are typically the addition polymers of organopolysiloxane having vinyl group and organohydrogenpolysiloxane. The organopolysiloxane having vinyl group include those having a vinyl group at the terminal end of molecular chain, those having a vinyl group bonded to a silicon atom in the main chain and those having vinyl groups bonded to the terminal end of molecular chain and to a silicon atom in the main chain. Examples thereof are alkyl($C_1$–$C_5$) vinylpolysiloxane, phenylvinylpolysiloxane, vinylalkoxy($C_1$–$C_2$)polysiloxane, alkyl($C_1$–$C_5$)vinylaralkyl($C_1$–$C_5$)polysiloxane, alkyl($C_1$–$C_5$)phenylvinylpolysiloxane, alkyl($C_1$–$C_3$)vinylhalo(F, Cl or Br)alkyl($C_1$–$C_4$)polysiloxane, alkyl($C_1$–$C_3$)vinylphenylhalo(F, Cl or Br)alkyl($C_1$–$C_4$)-polysiloxane, etc. The indication of carbon number given in the parentheses refers to the carbon number of the alkyl or alkoxyl group preceding the parentheses, the same as hereinafter.

The organohydrogenpolysiloxanes include those having hydrogen atoms bonded at the terminal end of molecular chain and/or to silicon atoms in the main chain. Examples thereof are alkyl($C_1$–$C_5$)hydrogenpolysiloxane, phenylhydrogenpolysiloxane, alkyl($C_1$–$C_5$)phenylhydrogenpolysiloxane, methylhydrogenglycidyloxypropylpolysiloxane, etc.

The ratio of organopolysiloxane having vinyl group to organohydrogenpolysiloxane to be mixed therewith is preferably such that the number of the hydrogen atoms bonded to silicon atoms will correspond to 50 to 500%, advantageously 150 to 300%, of the total number of vinyl groups.

Organopolysiloxanes of another reaction type are those described in "KEISO-JUSHI(Silicone-Resin)": by NAKAJIMA, et al., published by The INDUSTRIAL DAILY NEWS. These are generally called silicone varnishes, which will be cross-linked to form a three-dimensional reticular structure when treated at a relatively high temperature of about 200°C. Examples are methylsilicone varnish, phenylsilicone varnish, phenylmethylsilicone varnish, etc. When they are heated, the hydroxyl groups thereof undergo dehydration condensation. The methyl group may be replaced by ethyl group, propyl group, phenyl group, or the like.

Such organopolysiloxane to be hardened into a three-dimensional structure may be modified with alkyd resin, acryl resin, polyester, phenol resin, melamine resin, urethane resin or the like in order to lower the hardening temperature. The modified organopolysiloxane is usable in this invention without substantial adverse effects.

Exemplary of polysiloxane of another reaction type may also include an oily polysiloxane, so-called solventless silicone varnish, which has olefin group such as vinyl group. It is also one of the suitable materials for coating the fine powder according to this invention, since the vinyl groups undergo polymerization in the presence, for example, of peroxides.

Examples of the finely divided powder to be coated with the organopolysiloxane in this invention are various non-electroconductive and non-photoelectroconductive inorganic or organic materials which are usually white to pale colors. For example, they include finely divided powder of silicic acids, silicates, polyvalent metal carbonates such as calcium carbonate, magnesium carbonate, etc., polyvalent metal sulfates such as barium sulfate, calcium sulfate, etc., polyvalent metal oxides such as aluminum oxide, magnesium oxide, etc., polyvalent metal hydroxides such as aluminum hydroxide, barium hydroxide, magnesium hydroxide, etc., quartz sand, natural clays, clays processed for modification such as calcined clays, pulverized cellulose and starch. Inorganic materials which are known as semiphotoconductive metal oxides or sulfides such as zinc oxide, titanium oxide, cadmium sulfide and lead sulfide are not usable in this invention, since they render the dielectric layer photoconductive. The fine powder has an average particle size of 0.1 to 10$\mu$, preferably 1 to 5$\mu$.

Among the non-conductive and non-photoconductive materials enumerated above, calcined clays are especially preferable for use. The calcined clays can be prepared from clay minerals predominantly consisting of ferrosilicate minerals of aluminum, iron, magnesium and alkali metals, such as kaolin, sericite, bentonite, pyrophyllite, montmorillonite, talc, etc. by calcining them at 200° to 1,000°C. When calcined at such temperature, the fine powder of ferrosilicate minerals does not present noticeable changes in appearance, but X-ray diffraction patterns show that it has been made amorphous and therefore exhibits improved electric characteristics due to the release of so-called constitution water, i.e., physically absorbed water, chemically absorbed water and crystal water. Almost always, the calcining treatment reduces the apparent specific gravity of the starting material and renders the same porous, assuring remarkable improvements in writability and mat finished appearance of the recording material obtained.

The non-photoconductive fine powder is coated with organopolysiloxane by various methods. For instance, when organopolysiloxane is not subjected to cross-linking reaction, it is dispersed or dissolved in water or organic solvent, and the resulting dispersion or solution is mixed with the fine powder, followed by drying, whereby the powder will be coated. Alternatively when organopolysiloxane is to be subjected to cross-linking reaction, a suitable catalyst is added to the aqueous or solvent solution or dispersion of organopolysiloxane, and the mixture is further mixed with the fine powder. After drying the resulting mixture, it is heated for hardening. Usable for cross linking by condensation reaction are known acid or basic catalysts such as zinc octate, tin octate, tin oleate, dibutyl tin dioctate, dibutyl tin dilaurate, iron octate, lead octate, cobalt octate and like higher fatty acid salts of metals and butyl amine, dibutyl amine and like organic amines. The catalyst can be usually used in an amount of 0.1 to 20 weight percent, preferably 1 to 10 weight percent, based on the weight of the organopolysiloxanes. Usually, the condensation reaction is effected by heating the dried mixture at about 70° to 250°C. In order to decrease the curing temperature alkoxysilane or partially hydrolyzed product thereof can be used as a cross-linking agent. Examples of such cross-linking agent are $CH_3Si(OC_2H_5)_3$, $C_6H_5Si(C_2H_5)_3$, $CH_2{=}CHSi(OC_2H_5)_3$, $Si(OC_2H_5)_4$, $Si(OC_3H_7)_4$, $Si(OC_2H_4OCH_3)_4$, etc. Such cross-linking agent is usually in an amount of 1 to 10 weight percent, preferably 3 to 6 weight percent, based on the weight of the organopolysiloxanes. The catalysts to be used for cross linking by addition polymerization are platinum powder and chloroplatinic acid. The catalyst is used in an amount of 0.5 to 20 millionth part by weight, calculated as platinum and based on the total weight of organopolysiloxanes. Usually, the addition polymerization is easily conducted by heating the starting mixture at 100° to 180°C. To adjust the strength of the polysiloxane coating obtained, the mixture of vinyl-containing organopolysiloxane and organohydrogenpolysiloxane may contain another organopolysiloxanes such as methylpolysiloxane, methylphenylpolysiloxane, etc.

According to this invention the fine powder is completely or partially coated with organopolysiloxane. The amount of organopolysiloxane coating the fine powder is usually at least 0.1 wt.%, based on the fine powder, although variable with the kind, shape and particle size of the fine powder. The fine powder can be coated with a large amount of organopolysiloxane, but the amount more than 10 weight percent based on the fine powder gives no better results. Preferable amount is in the range of 1 to 6 weight percent, based on the weight of the fine powder.

The dielectric layer according to this invention is prepared from conventionally known polymeric substances having insulating properties. Examples are homopolymers or copolymers of vinyl monomers such as vinyl chloride, vinyl acetate, vinyl acetal, vinylidene chloride, ethylene, styrene, butadiene, acrylates, methacrylates, acrylonitrile, and crotonic acid; silicone resin; polyester; polyurethane; alkyd resin; epoxy resin; chlorinated rubber and the like. These high polymeric insulating substances can be used alone or in admixture with one another.

Such insulating polymeric substances are dissolved or dispersed in water or acetone, toluene, benzene, methyl ethyl ketone or like organic solvent, and the finely divided powder coated with organopolysiloxane as described above is mixed with and dispersed in the solution or dispersion to prepare a coating composition for forming the dielectric layer. Aqueous dispersions to be used for the preparation of coating compositions are preferably as follows: i) Aqueous dispersion containing 100 weight parts of a water-insoluble polymer consisting of at least one of ethylenic monomers including olefin, aromatic vinyl monomer, acrylate, methacrylate and vinyl halide and conjugated diolefinic monomers, 1 to 200 weight parts of a water-soluble polymer containing 8 to 50 mole % of carboxyl groups and 0 to 6 weight parts of nonionic emulsifier and/or anionic emulsifier, as disclosed in Japanese Patent Publication No. 32374/1973; ii) Aqueous solution of ammonium or amine salt of a copolymer comprising (a) a carboxyl-containing monomer containing 8 to 50 mole % of free carboxyl groups, (b) 5 to 60 mole % of an aromatic vinyl monomer and (c) 0 to 87 mole % of ethylenic monomer other than (b) and/or conjugated diolefinic monomer, as disclosed in Japanese Pat. Publication No. 3935/1974; and III) Ammoniacal or amine aqueous solution or dispersion of a watersoluble copolymer capable of forming a film at room temperature and comprising (a) a carboxyl-containing monomer containing 2 to 30 mole % of free carboxyl groups and (b) at least one monomer of aliphatic α-olefins in an amount polymerizable therewith, as disclosed in Japanese Pat. Application No. 88839/1972. The fine powder coated with organopolysiloxane is mixed with and dispersed in such aqueous dispersion to prepare a coating composition.

The coating composition thus prepared is advantageous in that it is mechanically and thermally stable and gives a dielectric layer having excellent recording characteristics. The amount of the fine powder coated with organopolysiloxane which must be determined in accordance with the particle size, shape and kind of the fine powder is 10 to 70 wt.%, preferably 30 to 60 wt.%, based on the dry weight of the dielectric layer, i.e., the total weight of solids in the composition. If the amount is less than 10 wt.%, the gloss and writing and printing properties of the resulting recording material can not be improved, while with the amount larger than 70 wt.% the electrostatic characteristics of the resulting recording material are impaired.

Further in the case of a coating composition of the solvent type, a very small amount of non-treated fine powder can be used in combination with the fine powder treated with organopolysiloxane to assure improved adsorption of aqueous ink.

The coating composition thus prepared is then applied by a conventional coater to a base sheet which has been processed to reduced electric resistivity and then dried. The base sheets to be employed in this invention are those conventionally known. They are rendered low in electric resistivity by known treatment as by causing them to contain, for example, inorganic salt, organic polymeric electrolyte, metal powder or carbon powder so that the treated surface will have resistivity of $10^5$ to $10^{11}$ ohms. Any of sheet materials is usable as the base sheet. Examples are paper, plastic film, cloth and metal foil, among which paper is inexpensive and easy to treat and is therefore most practical to use.

The electrostatic recording material of this invention appears and feels the same as substantially glossless ordinary paper for office use and has outstanding electrostatic characteristics to record clear and sharp copy images. Moreover, it is highly amenable to writing or marking.

This invention will be described below with reference to examples, but these examples are merely illustrative, but not limitative of the present invention. In the examples, parts and percentages are all by weight, unless otherwise specified. The properties of the recording material shown in the examples were determined by the following methods.

A. Saturated charge potential

Each of the coating compositions obtained in the following examples was applied to an aluminum foil, dried to form a 10-μ thick coating and then left to stand at 60% RH for 24 hours. Subsequently, the coated foil was charged by corona discharge at −6 KV and saturated charge potential was measured by electrometer of the rotating sector type. The saturated charge potential is in direct corresponding relation to the density of copy image. Accordingly, the higher the saturated charge potential is, the higher the density of copy image is. If the charge potential was below −200 V on a 10-micron thick coating, the density of obtained copy image was low and for this reason the composition used was evaluated as failing to fulfil the objects of this invention. The polarity of corona charge applied for the measurement of saturated charge potential may be positive as well as negative.

B. Gloss

Evaluated in terms of values measured by 75° Specular glossmeter. The higher the value, the more unnatural is the gloss of the dielectric layer. If the value of gloss is over 50, the paper does not show natural appearance and for this reason the composition used is evaluated as failing to fulfil the object of this invention.

C. Writing property

Markings were made on the surface of dielectric layer with a pencil, ball point pen and aqueous ink and evaluated by relative comparison. High writing property means high amenability to stamping.

EXAMPLES 1 to 9

Calcining treatment for clay

Natural clay of the aluminum silicate type consisting of crystals in the form of hexagonal plate was calcined in an electric furnace at 800°C for 1 hour, whereby the clay was found to be amorphous as determined by X-ray diffraction. The calcined clay had an average particle size of 2 μ.

Surface treatment of the calcined clay

Each of the various organopolysiloxanes to be given later was dissolved in toluol in combination with each of the catalysts and/or cross-linking agents shown later to prepare 10% toluol solution thereof. The solution was added to the calcined clay in an amount of 3% by solid weight based on the clay and fully mixed therewith. The mixture was heated under the conditions shown in Table 1 to evaporate off the solvent and to cross-link the organopolysiloxane coating the calcined clay.

Preparation of recording material

One surface of wood free paper consisting of 50 parts of NBKP and 50 parts of LBKP and weighing 60 g/m² was coated with aqueous solution of polyvinylbenzyltrimethyl ammonium chloride to prepare a base sheet having a surface resistivity of $10^6$ ohms.

In a solid ratio by weight of 1 : 1, the clay coated with the cross-linked organopolysiloxane as above was mixed with a 20% ammoniacal aqueous solution of a copolymer consisting of 30 parts of butadiene, 20 parts of styrene, 30 parts of methylmethacrylate and 20 parts of methacrylic acid to prepare a coating composition.

The coating composition was applied by an air blade coater to the other surface of the treated base sheet and then dried to obtain an electrostatic recording material having a dielectric layer of 10 g/m².

Organopolysiloxanes and catalysts used

In Example 1

1. Organopolysiloxane of the dehydration condensation type: 100 parts of hydroxyl terminated methylphenylpolysiloxane.

b. Catalyst: 1 part of zinc octylate. In Example 2 a. Organopolysiloxane of the dealcoholization condensation type: dimethylpolysiloxane having hydroxyl and alkoxyl groups in the molecule.

b. No catalyst.

In Example 3 a. Organopolysiloxane of the dehydrogenation condensation type: 100 parts of organopolysiloxane of a 10 : 1 weight ratio mixture of ω-dihydroxydimethylpolysiloxane and methylhydrogenpolysiloxane.

b. Catalyst: 1 part of dibutyl tin dioctate.

c. Cross-linking agent: 3 parts of tetramethylglycol orthosilicate.

In Example 4 a. Organopolysiloxane mixture of the addition polymerization type: a mixture of 70 parts of organopolysiloxane having viscosity of 3,000 cps (25°C) and comprising dimethylvinylsiloxy units and dimethylsiloxy units in the ratio of 0.5 mole of the former unit to 100 moles of the latter unit and 5 parts of organohydrogenpolysiloxane comprising SiO units and dimethylhydrogensiloxy units in the molar ratio of 1 : 2.

b. Catalyst: 0.05 part of 5% octyl alcohol solution of chloroplatinic acid.

In Example 5 a. Organopolysiloxane mixture of the addition polymerization type: a mixture of 10 parts of organopolysiloxane having a viscosity of 500 cps (25°C) and comprising trimethylsiloxy units, methylvinylsiloxy units and methylphenylsiloxy units in the molar ratio of 1 : 15 : 4 and 10 parts of organohydrogenpolysiloxane comprising methylhydrogensiloxy units, dimethylhydrogensiloxy units and diethylsiloxy units in the molar ratio of 5.5 : 1 : 3.

b. Catalyst: 0.02 part of 5% propyl alcohol solution of chloroplatinic acid.

In Example 6 a. Organopolysiloxane mixture of the addition polymerization type: a mixture of 100 parts of organopolysiloxane comprising dimethylvinylsiloxy units and dimethylsiloxy units in the molar ratio of 3 : 25, 3 parts of organopolysiloxane comprising methylhydrogensiloxy units and methylsiloxy units in the molar ratio of 5.5 : 3 and 3 parts of organopolysiloxane comprising trimethylsiloxy units, methylvinylsiloxy units and diethylsiloxy units in the molar ratio of 1 : 4 : 15.

b. Catalyst: 0.1 part of 5% ethylhexanol solution of chloroplatinic acid.

COMPARISON EXAMPLE 2

An electrostatic recording material was prepared in the same manner as in Example 1 except that the solution used for the surface treatment of the calcined clay was prepared by dissolving 3 parts of methyl methacrylate resin in 30 parts of a 1 : 1 weight ratio solvent mixture of toluol and methyl ethyl ketone.

COMPARISON EXAMPLE 3

An electrostatic recording material was prepared in the same manner as in Comparison Example 2 except that a copolymer of 90 mole % of vinyl chloride and 10 mole % of vinyl acetate was used in place of the methyl methacrylate resin.

COMPARISON EXAMPLE 4

An electrostatic recording material was prepared in the same manner as in Example 1 except that the fine powder was not used.

Various properties of the electrostatic recording materials are shown in Table 1.

Table 1

| | Heating conditions | Saturated charge potential (volts) 50 % RH | 85% RH | Surface gloss | Writing* property |
|---|---|---|---|---|---|
| Example | | | | | |
| 1 | 200 °C, 1 hr | −400 | −300 | 12 | A |
| 2 | 200°C, 1 hr | −380 | −290 | 15 | A |
| 3 | 90°C, 1 hr | −410 | −310 | 10 | A |
| 4 | 150°C, 20 min | −430 | −340 | 10 | A |
| 5 | 150°C, 20 min | −420 | −340 | 12 | A |
| 6 | 150°C, 20 min | −420 | −320 | 11 | A |
| 7 | 150°C, 20 min | −370 | −270 | 12 | A |
| 8 | 200°C, 3 hr | −380 | −300 | 15 | A |
| 9 | 200°C, 1 hr | −350 | −250 | 13 | A |
| Comp. Ex. | | | | | |
| 1 | — | −50 | 0 | 10 | A |
| 2 | 150°C, 20 min | −120 | −30 | 15 | A |
| 3 | 150°C, 20 min | −100 | −30 | 15 | A |
| 4 | — | −450 | −430 | 65 | C |

Note:
*Criteria of evaluation given above and in Tables to follow:
A: Excellent
B: Good
C: Poor In Example 7 a. Cross-linkable alkyd-modified organopolysiloxane: 100 parts of alkyd-modified slicone varnish (methylphenylpolysiloxane with hydroxyl ending modified with alkyd resin).

b. Catalyst: 1 part of zinc octylate.

In Example 8 a. Organopolysiloxane of the vinyl polymerization type: 100 parts of solventless silicone (methylphenylpolysiloxane with vinyl ending).

b. Catalyst: 1.5 parts of dicumyl peroxide.

In Example 9 a. Organopolysiloxane of the condensation type: 100 parts of methylhydrogenpolysiloxane.

b. Catalyst: 1 part of dibutyl tin dioctate.

COMPARISON EXAMPLE 1

An electrostatic recording material was prepared in the same manner as in Example 1 except that the calcined clay was not subjected to any surface treatment.

An electrostatic latent image was formed by usual electrophotographic process on a photosensitive plate comprising an aluminum sheet and a photosensitive layer of sensitized polyvinylcarbazole. The recording surface of dielectric layer of the electrostatic recording material prepared above was brought into intimate contact with the latent image bearing surface of the photosensitive plate. The rear surfaces of the two were short-circuited and then the recording material was separated from the plate to transfer the latent image onto the dielectric layer. Subsequently, the latent image on the recording material was made visible with a known developer of the wet type. The same procedure was followed for the recording materials of Examples and Comparison Examples above. Clear and sharp copy images were produced on the recording materials of Examples 1 to 9 with high density, even at a high humidity of 85% RH. Moreover, the dielectric layers had the same appearance as ordinary office paper and were found highly amenable to writing with a pencil, ball point pen and aqueous ink and to stamping.

In contrast, only very obscure copy images were found on the recording materials of Comparison Examples 1 to 3. In fact, it was almost impossible to obtain copy images at high humidity. The recording material of Comparison Example 4 had very unnatural surface gloss and failed to permit satisfactory writing and stamping with aqueous ink and oily ink because of its nonabsorbent property.

EXAMPLE 10

Dimethylpolysiloxane (silicone oil) was dissolved in toluol to prepare 10% solution. The solution was added to the calcined clay of Example 1 in an amount of 3% by solid weight based on the calcined clay. The mixture was then heated at 150°C for 5 minutes to evaporate off the solvent.

Subsequently following the same procedure as in Example 1, electrostatic recording material was prepared. The properties of the recording material are listed in Table 2.

EXAMPLE 11

Calcined clay of Example 1 was treated in the same manner as in Example 10 except that methylphenylpolysiloxane (silicone oil) was used as polysiloxane. Using the resulting surface-treated calcined clay, electrostatic recording material was prepared in the same manner as in Example 1. The properties of the recording material are listed in Table 2.

Table 2

| Example No. | Saturated charge potential (volts) 50% RH | 85% RH | Surface gloss | Writing property |
|---|---|---|---|---|
| 10 | −330 | −250 | 15 | A |
| 11 | −300 | −210 | 13 | A |

A signal charge was directly applied to these electrostatic recording materials at −800 volts for 100 microseconds to form electrostatic latent images, which were made visible as sharp copy images when developed with a positively charged developer of the dry type.

The dielectric surfaces of the materials did not have unnatural gloss and were found to be excellent in writing properties.

EXAMPLES 12 to 16

Surface treatment of fine powder

The organopolysiloxane mixture the same as in Example 4 was dissolved in toluol in combination with 0.05 part of 5% octyl alcohol solution of chloroplatinic acid to prepare 10% solution and the solution was added to each of various fine powders given below in an amount of 2% by solid weight based on the powder. The amount was fully mixed and then heated at 150°C for 20 minutes to evaporate off the solvent and to complete the cross-linking reaction.

Preparation of recording material

In the same manner as in Example 4, electrostatic recording materials were prepared.

Fine powders used

| | |
|---|---|
| In Example 12: silicic anhydride | (average particle size : 0.1 μ). |
| In Example 13: calcium carbonate | (average particle size : 0.2 μ). |
| In Example 14: barium sulfate | (average particle size : 3 μ). |
| In Example 15: natural clay | (average particle size : 2 μ). |
| In Example 16: corn starch | (average particle size : 8 μ). |

COMPARISON EXAMPLE 5

In the same manner as in Example 14, an electrostatic recording material was prepared, except that the barium sulfate used was not subjected to any surface treatment.

The properties of the electrostatic recording materials are listed in Table 3.

Table 3

| | Saturated charge potential (volts) 50% RH | Surface gloss | Writing property |
|---|---|---|---|
| Example 12 | −250 | 20 | B |
| 13 | −270 | 28 | B |
| 14 | −340 | 38 | B |
| 15 | −300 | 25 | B |
| 16 | −250 | 30 | B |
| Comp. Ex. 5 | −30 | 35 | B |

In the same manner as in Example 1, the electrostatic recording materials obtained were used for recording. Clear and sharp copy images were produced on those Examples of this invention. Furthermore the dielectric surfaces of the materials were free of unnatural gloss and had good writing property, whereas the recording materials of the Comparision Example gave an obscure copy image with a low density.

EXAMPLES 17 TO 20 AND COMPARISON EXAMPLES 6 AND 7

Four kinds of electrostatic recording materials were prepared in the same manner as in Example 5, except that the amount of the surface-treated calcined clay to be used were varied as shown in Table 4 below. The properties of the resulting recording materials are given in Table 4.

Table 4

| | Amount of* the treated clay (%) | Saturated charge potential (volts) 60% RH | Surface gloss | Writing property |
|---|---|---|---|---|
| Example 17 | 70 | −300 | 8 | A |
| 18 | 50 | −420 | 12 | A |
| 19 | 30 | −425 | 25 | B |
| 20 | 10 | −430 | 40 | B |
| Comp. Ex. 6 | 5 | −440 | 55 | C |
| 7 | 0 | −450 | 65 | C |

Note:
*Amount of the treated clay shows the percentage by weight of surface-treated calcined clay based on the dry weight of the dielectric layer formed.

In the same manner as in Example 1, the electrostatic recording materials obtained were used for recording. Clear and sharp copy images were produced on those of Examples 17 to 20. Furthermore the dielectric surfaces of the materials obtained in Examples 17 to 20 were free of unnatural gloss and had good writing property, whereas the recording materials of the Comparison Examples had very unnatural surface gloss and poor writing property.

EXAMPLES 21 TO 27

Various electrostatic recording materials were prepared in the same manner as in Example 5 except that following resins were used as insulating resin binders in the preparation of the recording materials.

In Example 21: Ammoniacal aqueous dispersion having solid concentration of 50% and containing 100 parts of 20 : 80 molar ratio butadiene-styrene copolymer and 14 parts of 30 : 55 : 15 molar ratio butadiene-methyl methacrylate-methacrylic acid copolymer.

In Example 22: Ammoniacal aqueous dispersion having solid concentration of 50% and containing 100 parts of 20 : 80 molar ratio butadienestyrene copolymer, 11 parts of 30 : 55 : 15 molar ratio butadiene-methyl methacrylatemethacrylic acid copolymer and 2 parts of polyoxyethylene lauryl ether (HLB=17).

In Example 23: Ammoniacal aqueous solution having solid concentration of 20% and containing copolymer of 91 mole % of ethylene and 9 mole % of acrylic acid.

In Example 24: Ammoniacal aqueous solution having solid concentration of 20% and containing copolymer of 94 mole % of ethylene and 6 mole % of maleic acid.

In Example 25: Methyl ethyl ketone solution having solid concentration of 20% and containing copolymer of 90 mole % of vinyl chloride and 10 mole % of vinyl acetate.

In Example 26: Methyl ethyl ketone solution of polyvinyl butylate having solid concentration of 15%.

In Example 27: Ammoniacal aqueous solution having solid concentration of 20% and containing copolymer of 90 mole % of vinyl acetate and 10 mole % of crotonic acid.

Table 5 shows the properties of the electrostatic recording materials obtained.

Table 5

| | Saturated charge potential (volts) 50% RH | 85% RH | Surface gloss | Writing property |
|---|---|---|---|---|
| Example 21 | −420 | −340 | 15 | A |
| 22 | −400 | −300 | 13 | A |
| 23 | −350 | −250 | 13 | A |
| 24 | −360 | −250 | 12 | A |
| 25 | −300 | −220 | 10 | A |
| 26 | −320 | −220 | 10 | A |
| 27 | −280 | −210 | 14 | A |

In the same manner as in Example 1, these electrostatic recording materials were used for recording, with clear and sharp copy images formed thereon with high density. Especially those of Example 21 to 24 gave distinct copy images even at a high humidity of 85% RH. The dielectric layers were all free of unnatural gloss and were found to be highly amenable to writing and stamping.

What we claim is:

1. In an electrostatic recording material consisting essentially of an electroconductive base sheet and a dielectric layer of organic polymer materials supported thereon, the electrostatic recording materials being characterized in that the dielectric layer contains 10 to 70 wt. % of non-conductive and non-photoconductive finely divided powder coated with organopolysiloxane having the organosiloxane units represented by the formula of

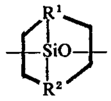

wherein $R^1$ is an organo group and $R^2$ is an organo group, hydrogen atom, hydroxyl or halogen atom.

2. The electrostatic recording material as set forth in claim 1 wherein the organopolysiloxane is cross-linked organopolysiloxane.

3. The electrostatic recording material as set forth in claim 2 wherein the cross-linked organopolysiloxane is a condensation product of polysiloxanes having organohydroxysiloxane units.

4. The electrostatic recording material as set forth in claim 2 wherein the cross-linked organopolysiloxane is a condensation product of polysiloxane having organohydroxysiloxane units and polysiloxane having organohydrogensiloxane units.

5. The electrostatic recording material as set forth in claim 2 wherein the cross-linked organopolysiloxane is a condensation product of polysiloxane having organohydroxysiloxane units and polysiloxane having alkoxysiloxane units.

6. The electrostatic recording material as set forth in claim 2 wherein the cross-linked organopolysiloxane is an addition polymer of polysiloxane having organosiloxane units containing vinyl group and polysiloxane having organohydrogensiloxane units.

7. The electrostatic recording material as set forth in claim 1 wherein the non-conductive and non-photoconductive finely divided powder is calcined clay.

8. The electrostatic recording material as set forth in claim 1 wherein the non-conductive and non-photoconductive finely divided powder has an average particle size of 0.1 to 10 $\mu$.

9. The electrostatic recording material as set forth in claim 1 wherein the non-conductive and non-photoconductive finely divided powder is coated with the organopolysiloxane in an amount of at least 0.1 wt.% based on the fine powder.

10. The electrostatic recording material as set forth in claim 9 wherein the amount of the organopolysiloxane is in the range of 1 to 6 wt.%.

11. The electrostatic recording material as set forth in claim 1 wherein said organo groups shown by $R^1$ and $R^2$ are each an alkyl group having 1 to 5 carbon atoms, acyl group having 2 to 4 carbon atoms, aminoalkyl group having 2 to 4 carbon atoms, iminoalkyl group having 2 to 4 carbon atoms, aralkyl group having 7 to 10 carbon atoms, phenyl group, alkoxyl group having 1 to 5 carbon atoms, acyloxyl group having 1 to 5 carbon atoms, alkenyl group having 2 to 8 carbon atoms or glycidyloxyl group.

12. The electrostatic recording material as set forth in claim 1, wherein said electroconductive base sheet is paper having a reduced electric resistivity.

* * * * *